(12) United States Patent
Cookman et al.

(10) Patent No.: US 10,845,486 B2
(45) Date of Patent: Nov. 24, 2020

(54) SATELLITE POSITIONING SYSTEM NAVIGATION BIT AIDING (71) Applicant: QUALCOMM Incorporated, San Diego, CA (US)

(72) Inventors: Jordan Cookman, San Jose, CA (US); Jie Wu, San Diego, CA (US); Rayman Pon, Cupertino, CA (US); Guttorm Ringstad Opshaug, Redwood City, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 16/142,094

(22) Filed: Sep. 26, 2018

(65) Prior Publication Data
US 2020/0096647 A1 Mar. 26, 2020

(51) Int. Cl.
G01S 19/25 (2010.01)
H04W 4/024 (2018.01)
G01S 19/30 (2010.01)
G01S 19/24 (2010.01)
H04B 1/7087 (2011.01)

(52) U.S. Cl.
CPC ............ *G01S 19/25* (2013.01); *G01S 19/243* (2013.01); *G01S 19/30* (2013.01); *H04B 1/7087* (2013.01); *H04W 4/024* (2018.02); H04B 2201/7073 (2013.01)

(58) Field of Classification Search
CPC ........ G01S 19/25; G01S 19/243; G01S 19/30; H04W 4/024; H04B 1/7087

USPC .................................................... 342/357.64
See application file for complete search history.

(56) References Cited

U.S. PATENT DOCUMENTS

| 6,933,886 | B1 | 8/2005 | Sahai et al. |
| 7,619,559 | B2 | 11/2009 | Diesposti |
| 2009/0189808 | A1* | 7/2009 | Chen ...................... G01S 19/29 342/357.29 |
| 2009/0262014 | A1 | 10/2009 | Diesposti |
| 2009/0273514 | A1 | 11/2009 | Pon |
| 2017/0311370 | A1* | 10/2017 | Dalsgaard ......... H04W 52/0216 |
| 2019/0277976 | A1* | 9/2019 | Naveen .................. G01S 19/30 |

(Continued)

FOREIGN PATENT DOCUMENTS

| WO | 2000014571 A1 | 3/2000 |
| WO | 2008115174 A1 | 9/2008 |
| WO | 2009024184 A1 | 2/2009 |

OTHER PUBLICATIONS

International Search Report and Written Opinion—PCT/US2019/051856—ISA/EPO—dated Jun. 17, 2020.

*Primary Examiner* — Harry K Liu
(74) *Attorney, Agent, or Firm* — Hunter Clark PLLC (57) ABSTRACT A method of processing a satellite signal includes: receiving a satellite positioning system (SPS) signal, including an SPS data signal of unknown data content, from a satellite at a wireless communication device; receiving symbol indications, of determined symbol values, from a terrestrial wireless communication system at the wireless communication device; correlating the SPS data signal with a pseudo-random noise code to obtain first correlation results; and using the symbol indications and the first correlation results to determine a measurement of the SPS signal.

31 Claims, 6 Drawing Sheets (56) References Cited

U.S. PATENT DOCUMENTS

2020/0067661 A1\* 2/2020 Siomina ................ H04W 4/06
2020/0092748 A1\* 3/2020 Teyeb ................. H04L 1/1848

\* cited by examiner

SATELLITE POSITIONING SYSTEM NAVIGATION BIT AIDING

BACKGROUND

For many mobile wireless communication device applications, it is often challenging to get good Satellite Positioning System (SPS) antenna performance due to the small form factor and cost limitations that are typical with such devices (e.g., smartphones, tablet computers, etc.). Losses due to poor antenna performance can be at least partially offset by increasing the effective coherent integration length. The increase can be in time domain (coherent integration over a longer time period) or signal component domain (coherent combining of data signal and pilot signal). A 3 dB gain in signal-to-noise ratio (SNR) can be achieved for each doubling in effective coherent integration length. For data-modulated SPS signals where the data (e.g., navigation (NAV)) bits are unknown, the coherent integration time is limited to a data symbol period, and coherent combining of data and pilot components is not possible.

SUMMARY

An example of a wireless communication device includes: a receiver configured to receive a satellite positioning system (SPS) signal, including an SPS data signal of unknown data content, from a satellite and to receive symbol indications, of determined symbol values, from a terrestrial wireless communication system; and a processor communicatively coupled to the receiver and configured to: perform correlation of the SPS data signal with a pseudo-random noise code to obtain first correlation results; and use the symbol indications and the first correlation results to determine a measurement of the SPS signal.

Implementations of such a device may include one or more of the following features. To determine the measurement of the SPS signal the processor is configured to: remove modulation from respective ones of the first correlation results based on the symbol indications; determine a coherent combination result by coherently combining a first one of the first correlation results, corresponding to a first data symbol, with a second correlation result; and determine the measurement of the SPS signal using the coherent combination result. To determine the coherent combination result, the processor is: configured to coherently integrate the first one of the first correlation results and the second correlation result, where the second correlation result is a second one of the first correlation results; or configured to coherently combine the first one of the first correlation results with a correlation result corresponding to an SPS pilot signal, where the correlation result corresponding to the SPS pilot signal is the second correlation result; or a combination of these. The processor is configured to receive signal quality indications corresponding to the symbol indications, and to determine, based on the signal quality indications, whether to use the symbol indications corresponding to the signal quality indications and associated ones of the first correlation results to determine respective coherent combination results.

Also or alternatively, implementations of such a device may include one or more of the following features. The processor is configured to coherently integrate the first correlation results, the device further including a memory, where the processor is further configured to buffer, in the memory, information associated with the SPS signal at least until a corresponding symbol indication is received and ready for use in determining whether to remove modulation of a respective one of the first correlation results. The processor is configured to buffer, as the information: a time domain sample of the SPS signal from an analog-to-digital converter; or a pre-processed time-domain sample of the SPS signal; or the correlation results; or a combination thereof. To determine the measurement of the SPS signal the processor is configured to obtain a carrier phase measurement by providing information regarding data symbols to a carrier tracking loop to determine a lock point of the carrier tracking loop, wherein the carrier tracking loop is configured to lock to a phase of the first correlation results. The satellite is a primary satellite and the processor is configured to determine bit-edge timing using pilot signals with overlay codes aligned to data bit timing, or by performing satellite-vehicle differencing with satellites, other than the primary satellite, for which bit-edge timing is known, or using external aiding information, or a combination of these.

An example of a method of processing a satellite signal includes: receiving a satellite positioning system (SPS) signal, including an SPS data signal of unknown data content, from a satellite at a wireless communication device; receiving symbol indications, of determined symbol values, from a terrestrial wireless communication system at the wireless communication device; correlating the SPS data signal with a pseudo-random noise code to obtain first correlation results; and using the symbol indications and the first correlation results to determine a measurement of the SPS signal.

Implementations of such a method may include one or more of the following features. The method may include: removing modulation from respective ones of the first correlation results based on the symbol indications; determining a coherent combination result by coherently combining a first one of the first correlation results, corresponding to a first data symbol, with a second correlation result; and determining the measurement of the SPS signal using the coherent combination result. Determining the coherent combination result includes: coherently integrating the first one of the first correlation results and the second correlation result, where the second correlation result is a second one of the first correlation results; or coherently combining the first one of the first correlation results with a correlation result corresponding to an SPS pilot signal, wherein the correlation result corresponding to the SPS pilot signal is the second correlation result; or a combination of these. The method may include: receiving signal quality indications corresponding to respective ones of the symbol indications; and determining, based on the signal quality indications, whether to use the symbol indications corresponding to the signal quality indications and associated ones of the first correlation results to determine respective coherent combination results. The method may include buffering, in the wireless communication device, information associated with the SPS signal at least until a corresponding symbol indication is received and ready for use in determining whether to remove modulation of a respective one of the first correlation results.

Also or alternatively, implementations of such a method may include one or more of the following features. The method may include determining bit-edge timing of the SPS signal. The satellite is a primary satellite and determining the bit-edge timing includes: using pilot signals with overlay codes aligned to data bit timing; or performing satellite-vehicle differencing with satellites, other than the primary satellite, for which bit-edge timing is known; or using external aiding information; or a combination of these. Determining the measurement of the SPS signal includes obtaining a carrier phase measurement by providing information regarding data symbols to a carrier tracking loop to determine a lock point of the carrier tracking loop. The method may include: receiving the SPS data signal at the terrestrial wireless communication system; determining symbols of the SPS data signal without performing at least one of forward error correction (FEC) decoding or deinterleaving; and sending the symbol indications to the wireless communication device, the symbol indications corresponding to the symbols of the SPS data signal determined without performing at least one of FEC decoding or deinterleaving.

Another example of a wireless communication device includes: means for receiving a satellite positioning system (SPS) signal, including an SPS data signal of unknown data content, from a satellite; means for receiving symbol indications, of determined symbol values, from a terrestrial wireless communication system; means for correlating the SPS data signal with a pseudo-random code to obtain first correlation results; and means for using the symbol indications and the first correlation results to determine a measurement of the SPS signal.

Implementations of such a device may include one or more of the following features. The means for using include: means for removing modulation from respective ones of the first correlation results based on the symbol indications; means for determining a coherent combination result by coherently combining a first one of the first correlation results corresponding to a first data symbol with a second correlation result: and means for determining the measurement of the SPS signal using the coherent combination result. The means for determining the coherent combination result include: means for receiving signal quality indications corresponding to respective ones of the symbol indications; and means for determining, based on the signal quality indications, whether to use the symbol indications corresponding to the signal quality indications and associated ones of the first correlation results to determine respective coherent combination results. The wireless communication device may include means for coherently integrating the first correlation results and means for buffering information associated with the SPS signal, the means for buffering being for buffering the information at least until a corresponding symbol indication is received and ready for use in determining whether to remove modulation of a respective one of the first correlation results. The means for using include locking means for locking to a phase of the first correlation results and for determining a lock point using the symbol indications. The wireless communication device may include means for determining bit-edge timing of the SPS signal.

An example of a non-transitory, processor-readable storage medium stores processor-readable instructions configured to cause a processor to: receive a satellite positioning system (SPS) signal, including an SPS data signal of unknown data content; receive symbol indications of determined symbol values; correlate the SPS data signal with a pseudo-random code to obtain first correlation results; and use the symbol indications and the first correlation results to determine a measurement of the SPS signal.

Implementations of such a storage medium may include one or more of the following features. The storage medium may include instructions configured to cause the processor to: remove modulation from respective ones of the first correlation results based on the symbol indications; determine a coherent combination result by coherently combining a first one of the first correlation results, corresponding to a first data symbol, with a second correlation result; and determine a position of a wireless communication device using the coherent combination result. The storage medium may include instructions configured to cause the processor to determine, based on signal quality indications, whether to use the symbol indications corresponding to the signal quality indications and associated ones of the first correlation results to determine respective coherent combination results. The storage medium may include instructions configured to cause the processor to buffer information associated with the SPS signal before coherently integrating the first correlation results corresponding to the information. The information may include: a time domain sample of the SPS signal from an analog-to-digital converter; or a pre-processed time-domain sample of the SPS signal; or the correlation results; or a combination thereof.

Also or alternatively, implementations of such a storage medium may include one or more of the following features. The instructions configured to cause the processor to determine the measurement of the SPS signal may include instructions configured to cause the processor to obtain a carrier phase measurement by providing information regarding data symbols to a carrier tracking loop to determine a lock point of the carrier tracking loop. The SPS signal is associated with a primary satellite and the storage medium includes instructions configured to cause the processor to determine bit-edge timing by: using pilot signals with overlay codes aligned to data bit timing; or performing satellite-vehicle differencing with satellites, other than the primary satellite, for which bit-edge timing is known; or using external aiding information; or a combination of these.

DETAILED DESCRIPTION

Techniques are discussed herein for improving accuracy of position determined from satellite signals. For example, a satellite positioning system (SPS) receiver is configured and positioned to receive SPS data signals, of unknown data, with high quality. The SPS receiver may have a high-quality SPS antenna and may be disposed in an environment with few if any obstacles between the SPS receiver and SPS satellites. The SPS receiver may be able to determine values of data symbols corresponding to modulation levels of an SPS pilot signal without having to perform one or more procedures (e.g., Forward Error Correction (FEC) decoding or parity checking) that a device with lower reception quality may typically have to perform to determine symbol values. The SPS receiver sends (e.g., broadcasts) the symbol values to one or more mobile wireless communication devices. A mobile wireless communication device can use the symbol values provided by the SPS receiver to determine whether to remove modulation from (e.g., invert (i.e., perform sign-inversion on)) correlation results obtained by correlating the SPS data signal with one or more pseudo-random noise (e.g., coarse/acquisition) codes. The mobile device combines the correlation results, with modulation removed as appropriate, of multiple symbols to improve the signal-to-noise ratio (SNR) compared to the correlation result for a single symbol. The mobile device may integrate an SPS data signal over multiple symbols to improve the SNR and/or may combine correlation results of one or more SPS data signal symbols with correlation results of one or more corresponding SPS pilot signal symbols and integrate the combined correlation results. These techniques are examples only, and not exhaustive.

Items and/or techniques described herein may provide one or more of the following capabilities, as well as other capabilities not mentioned. For example, SNR of SPS signals may be improved. Positioning accuracy using SPS data signals may be improved. A sensitivity of the receiver may be improved such that information may be derived from weaker signals than without using the techniques discussed herein. A position may thus be determined in signal conditions in which typically no position would be able to be determined. Effective coherent integration of SPS data signals may be increased, and may be increased regardless of the type of data (i.e., may be data agnostic), the field in which the data reside (e.g., fields for which data values are difficult or impossible to predict), or the timing of the data (e.g., when data values are hard to predict such as with ephemeris data updates). Losses due to antenna design can be offset. Positioning accuracy may be improved in traditionally difficult environments such as canyons, urban canyons (e.g., area with multiple nearby buildings), indoors, etc. Lock-point resolution may be sped up. Precise precision positioning performance may be improved. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Figure 1:
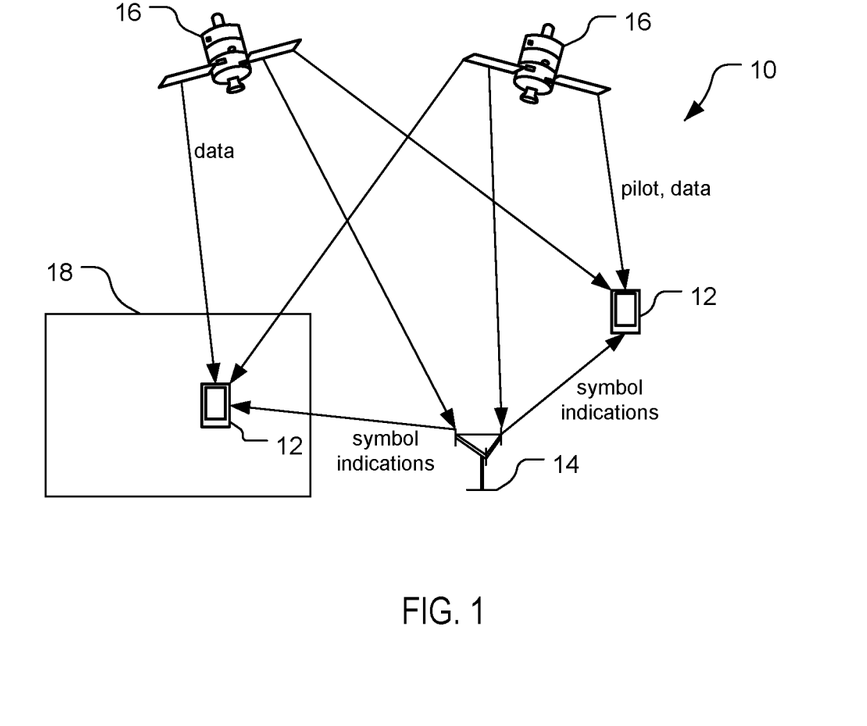
FIG. 1 is a simplified diagram of a satellite positioning system.

Referring to FIG. 1, an SPS environment 10 includes mobile devices 12, a base transceiver station (BTS) 14, satellites 16, and a building 18. The environment 10 may be used to determine positions of the mobile devices 12 by use of satellite signals from the satellites 16 (although only two satellites 16 are shown, more than two satellites 16 may be included in the environment 10). The mobile devices 12 can be moved to various locations, including into the building 18 or other structure, into regions where reception of satellite signals is difficult, etc.

The mobile devices 12 are mobile wireless communication devices and may take any of a variety of forms and may be referred to by any of a variety of terms. For example, while the mobile devices 12 are shown as mobile phones, a mobile device may be a cellular or other wireless communication device, a personal communication system (PCS) device, a personal navigation device (PND), a Personal Information Manager (PIM), a Personal Digital Assistant (PDA), a tablet computer, a laptop computer, a notebook computer, or some other suitable mobile device which may be capable of receiving wireless/cellular communication signals and navigation signals, such as navigation positioning signals. The mobile devices 12 may be referred to as user equipments (UEs), mobile stations, mobile terminals, subscriber units, etc.

The BTS 14 is a terrestrial wireless communication system configured to receive satellite signals and communicate with the mobile devices 12. The BTS 14 is shown as a cellular communication tower, but other configurations of the BTS 14 may be used. The BTS 14 and the mobile devices 12 are configured to communicate bi-directionally with each other using one or more wireless communication protocols (e.g., 5G, GSM (Global System for Mobiles), CDMA (Code Division Multiple Access), LTE (Long-Term Evolution), etc.). Further, while only one BTS 14 is shown in FIG. 1, more than one BTS 14 may be used in the environment 10. The BTS 14 can wirelessly communicate with the mobile devices 12 via one or more antennas. The BTS 14 may also be referred to as an access point, an access node (AN), a Node B, an evolved Node B (Enb), etc.

The satellites 16 are configured to transmit SPS signals to the mobile devices 12 and to the BTS 14. Transmitted satellite signals may include, for example, signals marked with a repeating pseudo-random noise (PN) code of a set number of chips. The PN code may be referred to as a coarse/acquisition (C/A) code or Gold code. The satellite signals may include SPS pilot signals (with unmodulated PN codes) and/or SPS data signals with modulated PN codes. The data signals include data (modulated in the signal) that are unknown to the BTS 14 or to the mobile devices 12. For example, SPS data signals may include PN codes modulated by navigation (NAV) bits. The modulation may invert the PN code based on the value of the NAV bit by multiplying the PN code by negative one (−1). A protocol may be that a NAV bit value of 0 causes the PN code to be inverted and a NAV bit value of 1 results in no change to the PN code. Alternatively, a protocol may be that a NAV bit value of 1 results in the PN code being inverted. Either protocol (or other protocol) may be used, with the receiving devices knowing or being informed of the protocol. In the example shown in FIG. 1, the satellite $16_1$ transmits data signals and the satellite $16_2$ transmits pilot signals and data signals.

The satellites 16 are part of an SPS for use in determining locations of the mobile devices 12. Satellite positioning systems may include such systems as the Global Positioning System (GPS), Galileo, Glonass, Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Techniques/procedures presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

Figure 2:
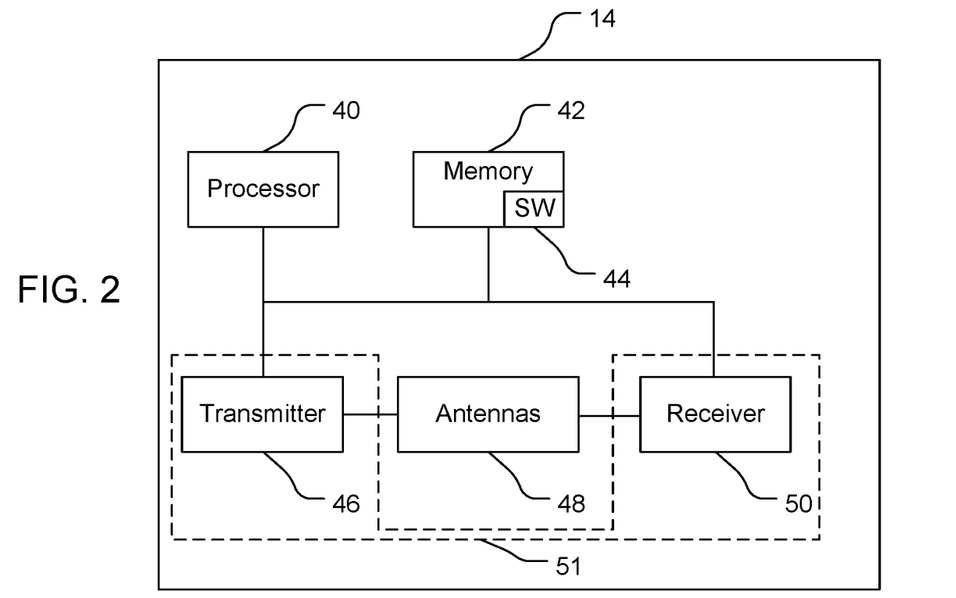
FIG. 2 is a block diagram of a terrestrial communication system shown in FIG. 1.

Referring also to FIG. 2, the BTS 14 comprises a computer system including a processor 40, memory 42 including software 44, a transmitter 46, antennas 48, and a receiver 50. While the BTS 14 is shown with a single processor 40 and a single memory 42 (with corresponding software 44), the BTS 14 may have multiple processors and/or memories, e.g., with a processor 40 and a memory 42 (with corresponding software 44) for each sector served by the BTS 14, e.g., each of three sectors. The transmitter 46, the antennas 48, and the receiver 50 form a wireless communication module (with the transmitter 46 and the receiver 50 being a transceiver 51) in the BTS 14. The transmitter 46 and the receiver 50 are configured to communicate bi-directionally with the mobile device 12 via a corresponding antenna 48. The processor 40 is preferably an intelligent hardware device, e.g., a central processing unit (CPU) such as those made by QUALCOMM®, ARM®, Intel® Corporation, or AMD®, a microcontroller, an application specific integrated circuit (ASIC), etc. The processor 40 could comprise multiple separate physical entities that can be distributed in the BTS 14, and/or with one or more entities disposed outside the BTS 14 in one or more other devices. The memory 42 includes random access memory (RAM) and read-only memory (ROM). The memory 42 is a non-transitory, processor-readable storage medium that stores the software 44 which is processor-readable, processor-executable software code containing processor-readable instructions that are configured to, when executed, cause the processor 40 to perform various functions described herein (although the description may refer only to the processor 40 performing the functions). Alternatively, the software 44 may not be directly executable by the processor 40, but configured to cause the processor 40, e.g., when compiled and executed, to perform the functions.

Figure 3:
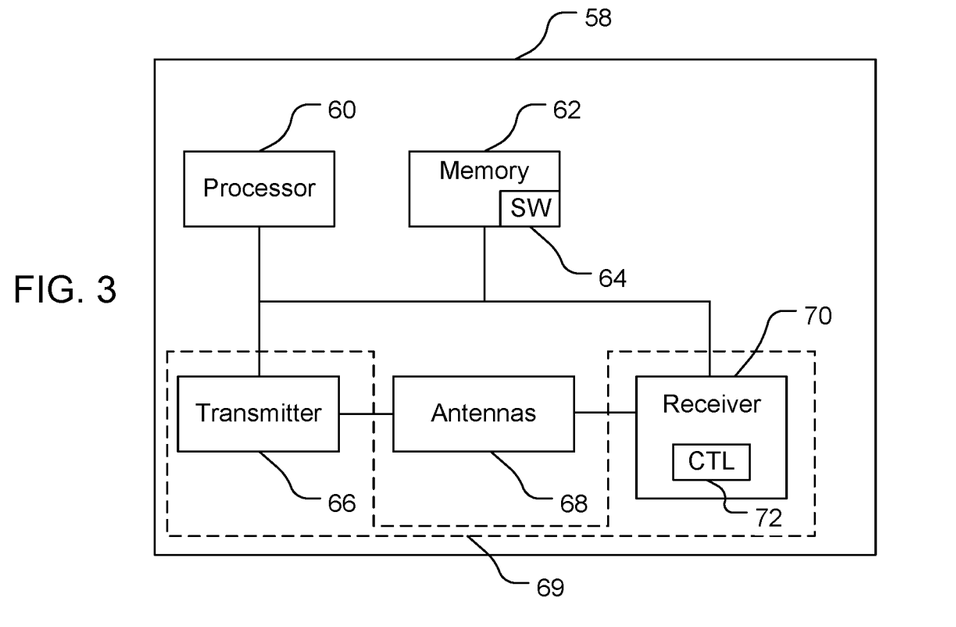
FIG. 3 is a block diagram of a mobile wireless communication device shown in FIG. 1.

Referring also to FIG. 3, a mobile device 58, which is an example of one of the mobile devices 12, comprises a computer system including a processor 60, memory 62 including software 64, a transmitter 66, antennas 68, and a receiver 70. While the mobile device 58 is shown with a single processor 60 and a single memory 62 (with corresponding software 64), the mobile device 58 may have multiple processors and/or memories. The transmitter 66, the antennas 68, and the receiver 70 form a wireless communication module (with the transmitter 66 and the receiver 70 being a transceiver 69) in the mobile device 58. The transmitter 66 and the receiver 70 are configured to communicate bi-directionally with the BTS 14 via a corresponding antenna 68. The processor 60 is preferably an intelligent hardware device, e.g., a central processing unit (CPU) such as those made by QUALCOMM®, ARM®, Intel® Corporation, or AMD®, a microcontroller, an application specific integrated circuit (ASIC), etc. The processor 60 could comprise multiple separate physical entities that can be distributed in the mobile device 58. The memory 62 includes random access memory (RAM) and read-only memory (ROM). The memory 62 is a non-transitory, processor-readable storage medium that stores the software 64 which is processor-readable, processor-executable software code containing processor-readable instructions that are configured to, when executed, cause the processor 60 to perform various functions described herein (although the description may refer only to the processor 60 performing the functions). Alternatively, the software 64 may not be directly executable by the processor 60, but configured to cause the processor 60, e.g., when compiled and executed, to perform the functions.

Portions of the mobile device 58 may determine a measurement of a received SPS signal. The measurement, e.g., time of arrival based on a PN code or a carrier signal phase, which can be used to determine time of travel from a satellite (with time of arrival based on carrier signal phase possibly providing more precise time of travel) may be determined by the processor 60, at least one of the antennas 68, and the receiver 70. The time of arrival of the SPS signal may be used to determine a position of the mobile device 58. The memory 62 may or may not be used depending on whether the processor 60 is configured to perform appropriate functions without executing the software 64 or using other information stored in the memory 62. A carrier tracking loop (CTL) 72 may be used to determine the carrier signal phase of an SPS signal and may not be used for determining PN code time of arrival. Thus, depending on the desired information to be obtained and determined, the transmitter 68, one or more of the antennas 68, the memory, and/or the CTL 72 may be omitted or at least not used.

Figure 4:
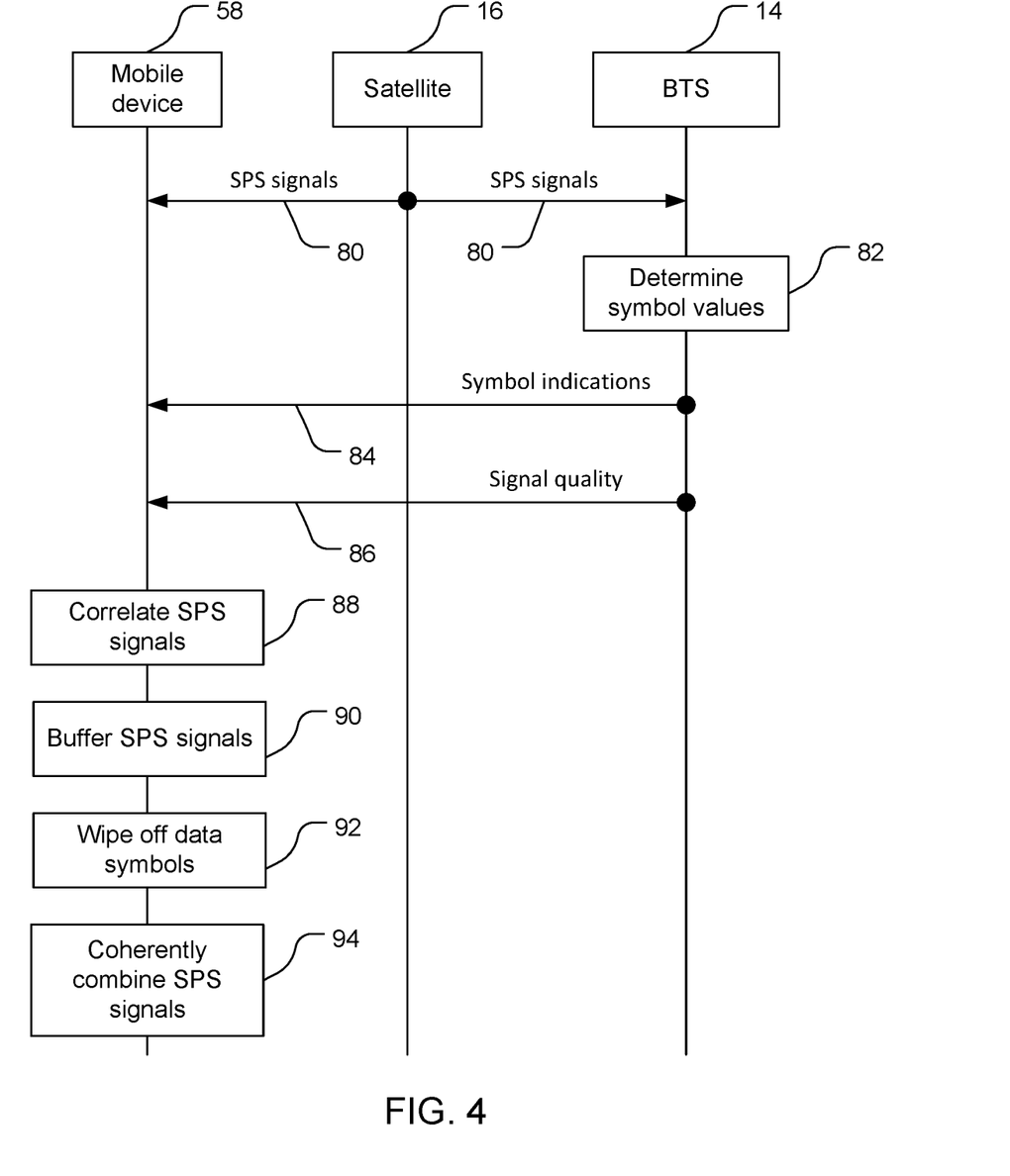
FIG. 4 is a signal flow diagram.

Referring also to FIG. 4, the BTS 14 and the mobile device 58 are configured to work in conjunction with the satellites 16 to implement a position determination system. The mobile device 58 may determine the position of the mobile device using SPS signals from the satellites 16 and information determined by the BTS 14 from SPS signals and provided by the mobile device 58 as discussed herein. As shown in FIG. 4, the satellite 16 is configured to send 80 SPS signals (which may include SPS data signals and/or SPS pilot signals) to the mobile device 58 and the BTS 14.

The BTS 14 may be disposed and/or configured to receive the SPS data signals, with unknown data, with high enough quality, e.g., SNR, that the BTS 14 can determine symbol values of the SPS signals without performing Forward Error Correction (FEC) decoding. The BTS 14 may be disposed in an open area, with an unobstructed view of the sky. For example, the BTS 14 may be disposed on top of a building with no other nearby buildings being higher than the building on which the BTS 14 is disposed. Further, the antennas 48 may include an SPS antenna with higher gain than an SPS antenna of the mobile devices 12. The SPS antenna can receive SPS signals from the satellites 16 and provide the SPS signals to the receiver 50 that can process and provide the SPS signals to the processor 40. The processor 40 is configured to analyze the received SPS signals to determine 82 values of data symbols of the received SPS signals without performing FEC decoding and/or deinterleaving. Data symbols are the modulation levels of the SPS signals after FEC encoding while data bits are the SPS signals before FEC encoding. For SPS signals that do not use FEC encoding (e.g., GPS L1 C/A), data symbols and data bits are the same. For SPS signals where FEC encoding is used, there are two data symbols for each data bit. The processor 40 may be able to estimate the SNR or a similar (e.g., equivalent) metric (such as carrier-to-noise density ($C/N_0$)) and use this information to determine a duration for integrating a symbol before making a decision as to the symbol value. With high enough SNR in the received signal analyzed by the processor 40, the processor 40 may be able to determine the symbol value quickly, e.g., within 1 ms or less, based on the quality (e.g., SNR) of the SPS signal without performing another procedure (e.g., FEC decoding or parity checking or deinterleaving) on the SPS signal to determine the value of the symbol. For example, the processor 40 may compare amplitudes of chips of the received signal against known PN codes to determine whether the received signal is inverted or not and determine a corresponding symbol value. The symbol value may be a hard value (e.g., a 1 or 0 meaning inverted or not, depending on the protocol) or a soft value (e.g., soft decisions or log-likelihood ratios that can be used to form branch metrics for a Viterbi decoder). An example of a soft decision is an 8-bit signed representation of a received symbol with a sign of the 8-bit number indicating whether the symbol is inverted or not and a magnitude of the 8-bit number indicating a confidence level as to whether the decision to invert or not is correct.

The processor 40 may be configured to send 84 symbol indications of the determined symbol values to the mobile devices 12 via the transmitter 46 and one or more of the antennas 48. The processor 40 may broadcast, multicast, and/or unicast the symbol indications to respective ones of the mobile devices 12. Alternatively, a processor separate from the BTS 14 may obtain the symbol values and produce and send the symbol indications to the mobile devices 12. The symbol values may be sent to the mobile devices 12 using any of a variety of communication technologies, such as 5G wireless communications.

The processor 40 may be able to send a symbol indication before the entire corresponding data symbol has been received. For example, if the signal level is strong enough, e.g., above a threshold level, then the processor 40 may be able to determine the symbol indication before receiving the entire symbol, and send the symbol indication to one or more of the mobile devices 12. For example, GPS L1 C/A data symbols are 20 ms in length, but at strong signal levels, the symbol values may be reliably determined after a small portion of the symbol length, e.g., 1 ms or less, 3 ms or less, 5 ms or less, etc. The BTS 14 may send the symbol indication once determined, e.g., within 1 ms of being determined, within 2 ms of being determined, etc., to the mobile device 12. Further, the transceiver 51 and at least one of the antennas 48 may be configured to transmit information rapidly, e.g., in accordance with 5G or other protocol (presently existing or developed in the future), to the mobile device 12. Thus, the BTS 14 may be configured to determine and send the symbol indication such that the mobile device 12 may receive the symbol indication from the BTS 14 with low latency, e.g., less than 2 ms, or 5 ms, or 10 ms, or 20 ms, or 100 ms, or 1 second, etc., after the mobile device 12 receives the signal, corresponding to the symbol indication, from the satellite 16.

The processor 40 may be configured to determine and send 86 signal quality information to the mobile devices 12. The processor 40 may determine signal quality information of the received SPS signals such as carrier-to-noise density ($C/N_0$, i.e., the ratio of the carrier power and the noise power per unit of bandwidth), receiver synchronization state, estimated pre-FEC bit error rate (BER), satellite elevation, etc. The processor 40 may provide one or more indications of one or more of these signal quality characteristics to the mobile devices 12 via the transmitter 46 and one or more of the antennas 48 as appropriate. The processor 40 may be configured to analyze the signal quality information to determine whether corresponding determined symbol values are reliable (e.g., the signal quality is high enough that the likelihood of the determined symbol value being correct exceeds a threshold, e.g., 70%) and only transmit the symbol indications that the processor 40 determines to be reliable.

The mobile device 58 is configured to receive and process SPS signals. The antennas 68 may include an SPS antenna that is configured to receive SPS signals from the satellites 16 and provide the SPS signals to the receiver 70 that can process and provide the SPS signals to the processor 60. At least one of the antennas 68 and the receiver 70 are configured to receive SPS signals, process the signals as appropriate (e.g., convert from analog to digital), and provide the SPS signals to the processor 60. The processor 60 is configured to process the SPS signals as discussed herein. The processor 60 can process data signals of unknown data using symbol indications from the BTS 14, faster than without these indications and without independently (without the symbol indications) determining data values of the data signals, to determine signal measurements (e.g., time of travel) for position determination.

The processor 60 may be configured to analyze the received SPS signals and correlate 88 the received SPS signals with one or more PN codes. The PN codes may be stored in the memory 62, or produced to be available as needed or otherwise desired, and the processor 60 may correlate the PN codes (C/A codes) with (e.g., multiply the PN codes by) the received SPS signals to produce correlation results. The processor 60 may be configured to alter (e.g., shift) the stored PN code in time relative to the received SPS signal for correlation to help determine a time of arrival, and thus a time of travel, of the SPS signals as is known in the art.

The processor 60 may be configured to buffer 90 the SPS signals. For example, the processor 60 may buffer the SPS signals before coherent integration, e.g., at least until the symbol indication corresponding to a buffered portion of an SPS signal is received and processed by the processor 60. The processor 60 may buffer the SPS signals for at least an amount of time corresponding to the time between receiving an SPS data signal and having a symbol indication ready for use in removing the modulation of one or more respective symbols of the SPS data signal. The processor 60 may buffer the SPS signals by storing them in the memory 62. The buffered SPS signals may be time domain samples from an analog-to-digital (A/D) converter (e.g., that is part of the receiver 70), pre-processed time-domain samples from a signal processor (e.g., that is part of the receiver 70 and/or the processor 60), initial correlations (i.e., correlation results including partial correlation results and/or full correlation results) from one or more initial coherent integration processes performed by the processor 60 (e.g., where the initial coherent integration period is less than or equal to the data symbol period), etc. The amount of buffering by the processor 60 may be reduced if the BTS 14 sends the symbol indications before receiving the entire corresponding symbols, e.g., if the strength of the SPS data signal received by the BTS 14 is above a threshold).

The mobile device 58 may receive and process the symbol indications from the BTS 14 for use in wiping off 92 (i.e., removing) data modulation of the received data symbols in order to allow for increasing of the effective coherent integration length. At least one of the antennas 68 and the receiver 70 are configured to receive the symbol indications from the BTS 14, process the symbol indications as appropriate (e.g., convert from analog to digital), and provide the symbol indications to the processor 60. The processor 60 may be configured to use the value of each of the symbols as indicated by the symbol indications to wipe off the data modulation of the respective data symbol, i.e., to determine (according to the protocol in use by the satellite 16 sending the corresponding SPS signals) whether to invert the correlation result of the SPS data signal corresponding to the symbol indication. Thus, without the processor 60 performing a procedure typically performed by a mobile device to determine a data bit value, such as FEC decoding or parity checking, the processor 60 may use the information provided by the BTS 14 to invert or not invert, as appropriate, the correlation result of the corresponding SPS data signal portion. Knowing that the correlation result is properly inverted, or properly not inverted, the processor 60 may use the correlation result for coherent combining (e.g., coherent integration of the correlation result for the SPS data signal portion and the correlation result for another SPS data signal portion that are cumulatively longer than a data symbol period and/or coherent combining of the correlation result of the SPS data signal with a correlation result of an SPS pilot signal, and coherent integration of the combination) to increase the effective coherent integration length.

To wipe off the data modulation of the determined data symbols as indicated by the symbol indications, the mobile device 58 may determine bit-edge timing of the SPS data signal. For example, the processor 60 may use pilot signals with overlay codes that are aligned to data bit timing, may perform satellite vehicle differencing (SV-differencing) with other satellites 16 for which bit-edge timing is known, may sync to an SPS pilot signal, may use stronger SPS signals to determine and/or predict bit-edge timing of weak SPS signals, may use external aiding (e.g., bit-edge timing information from the BTS 14 and/or other source), and/or may use other means to determine bit-edge timing of the SPS data signal. The pilot signals are acquired by correlating with known PRN sequences and overlay codes, with the overlay codes aligned with data bit periods in a known fashion such that once the timing of an overlay code is acquired, the data bit timing is also known.

The processor 60 may be configured to determine whether to use a received symbol indication to wipe off the data modulation of a corresponding data symbol and/or whether to use the corresponding data symbol for positioning. The processor 60 may be configured to analyze signal quality information received from the BTS 14 to determine whether a corresponding symbol indication is reliable (e.g., the signal quality is high enough that the likelihood of the determined symbol value being correct exceeds a threshold, e.g., 70%). The processor 60 may be configured to use a symbol indication to wipe off the data modulation of a corresponding data symbol, and/or to use the SPS data signal portion corresponding to the symbol indication for further processing (e.g., coherent combining), only if the processor 60 determines that the symbol indication is reliable.

The processor 60 may coherently combine 94 SPS signals. For example, the processor 60 may coherently integrate signals such as the correlation results, and may do so for periods longer than a symbol length as discussed herein. For example, the processor 60 may coherently integrate the correlation results for different (e.g., consecutive) data symbols of the SPS data signal. The processor 60 may also or alternatively combine one or more correlation results for an SPS data signal with one or more corresponding correlation results for an SPS pilot signal (with the corresponding correlation results corresponding in time, i.e., pilot and data signals being received at the same time). The processor 60 may coherently integrate the combined correlation results. In either of these ways (or both), the effective coherent integration length is increased compared to integrating a single SPS signal over a symbol period or less. For each doubling in effective coherent integration length, a gain of 3 dB in SNR may be achieved. The improved SNR may help the processor 60 align the time-shifted PN code and the incoming SPS signal, which in turn helps resolve time of arrival of the SPS signal, which corresponds to time of travel of the SPS signal, which can be translated into distance to a satellite 16 for use in determining position of the mobile device 58. Thus, improving the effective coherent integration length can help improve positioning accuracy of the mobile device 58. Also or alternatively, a sensitivity of the receiver may be improved such that information may be derived from weaker signals than without using the techniques discussed herein. A position may thus be determined in signal conditions in which typically no position would be able to be determined.

The mobile device 58 may be configured to implement one or more precise positioning techniques such as Precise Point Positioning (PPP) and/or Real-Time Kinematic (RTK) positioning. The receiver 70 may include the carrier tracking loop (CTL) 72 that is configured to measure the phase of the carrier signal of the SPS data signal. The phase of the carrier signal may be measured directly by a phase-locked loop (PLL) or indirectly with a frequency-locked loop (FLL) and a phase estimator. The CTL 72 uses one or more known data bits to determine lock polarity once a loop is locked to the carrier signal. In typical GPS L1 C/A systems, a known 8-bit preamble sequence is provided once every 6 seconds. Using the techniques discussed herein, however, any data symbol (or possibly any data symbol that was reliably determined) can be provided to the CTL 72 and used by the CTL 72 as a phase reference to determine the lock polarity once the CTL 72 has locked to the carrier signal of the SPS data signal. By not having to wait for a specific, periodically-provided, known data bit and instead providing a data symbol with high reliability and low latency for a locking loop, faster lock point polarity (and thus phase) resolution and improved precise positioning performance may be achieved when lock is lost (e.g., for first acquisition of an SPS data signal of after loss of lock to the SPS data signal). A position may thus be determined using the received data symbols in signal conditions in which typically no position would be able to be determined, e.g., if incoming signals are too weak or otherwise of too poor of quality. Implementing PPP and/or RTK may allow a position of the mobile device 58 to be determined more accurately (with greater precision) than using PN code alignment to determine time of arrival of an SPS signal.

Figure 5:
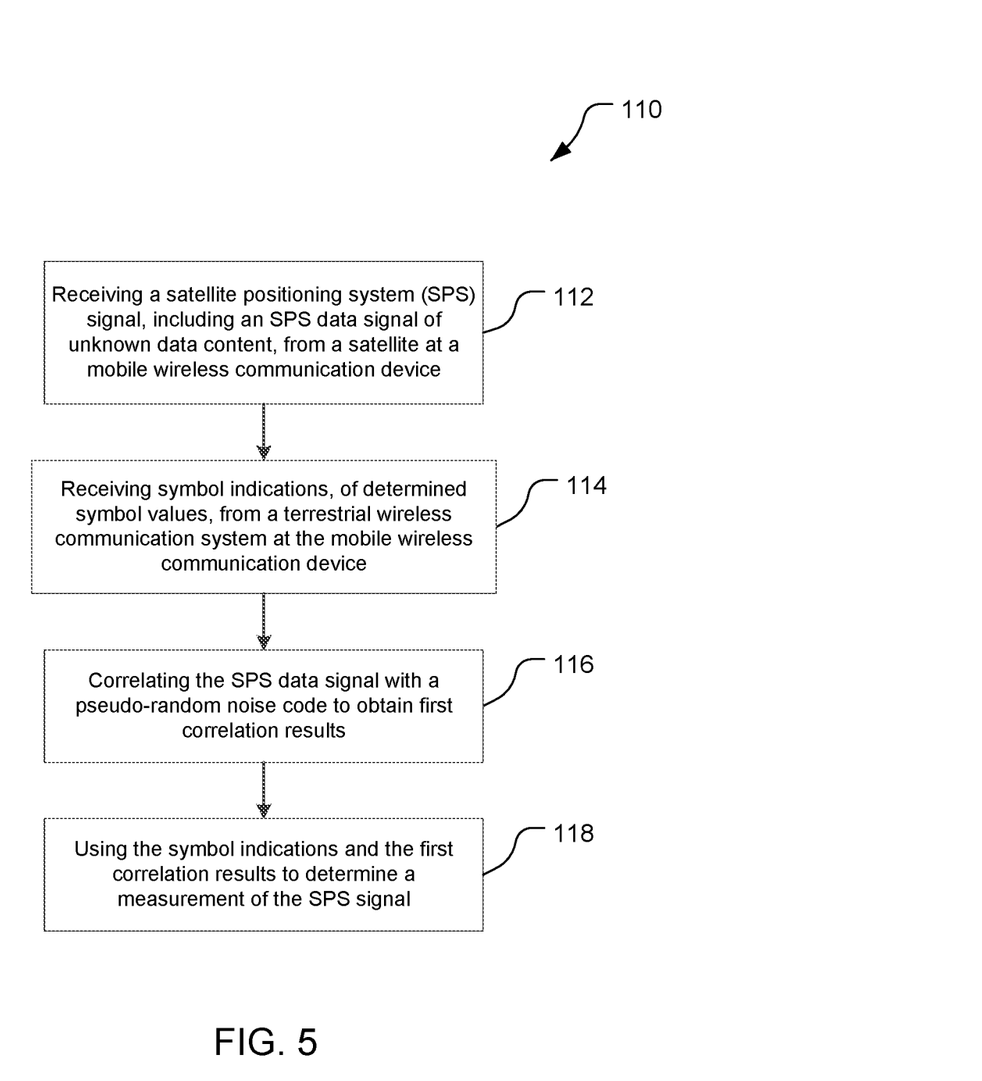
FIG. 5 is a block diagram of a method of processing a satellite signal.

Referring to FIG. 5, with further reference to FIGS. 1-4, a method 110 of processing a satellite signal includes the stages shown. The method 110 is, however, an example only and not limiting. The method 110 may be altered, e.g., by having stages added, removed, rearranged, combined, performed concurrently, and/or having single stages split into multiple stages.

At stage 112, the method 110 includes receiving a satellite positioning system (SPS) signal, including an SPS data signal of unknown data content, from a satellite at a mobile wireless communication device. For example, the mobile device 58 receives, via one of the antennas 68 and the receiver 70, an SPS data signal, and possibly an SPS pilot signal, from the satellite 16. The mobile device 58 may receive SPS data signals from multiple satellites 16.

At stage 114, the method 110 includes receiving symbol indications, of determined symbol values, from a terrestrial wireless communication system at the mobile wireless communication device. For example, the BTS 14 receives the SPS data signal from the satellite 16 with sufficient strength to determine symbol values before FEC decoding and/or deinterleaving and sends the symbol indications of the symbol values to the mobile device 58. The mobile device 58 receives the symbol indications, via at least one of the antennas 68 and the receiver 70, for corresponding portions of the SPS data signal.

At stage 116, the method 110 includes correlating the SPS data signal with a PN code to obtain first correlation results. For example, the mobile device 58 (e.g., the processor 60) correlates the SPS data signal with one or more Gold codes, altering a timing of the Gold code(s) with respect to the received SPS data signal. The correlation yields correlation results.

At stage 118, the method 110 includes using the symbol indications and the first correlation results to determine a measurement of the SPS signal. For example, the mobile device 58 (e.g., the processor 60) uses the symbol indications and the first correlation results to determine a time of arrival of the SPS signal, and may further use the time of arrival to determine a pseudo-range from the mobile device 58 to the satellite 16 and use this pseudo-range, possibly with other pseudo-ranges, to determine a position of the mobile device 58. By using the symbol indications of determined symbol values, the mobile device 58 (e.g., the processor 60) may avoid determining the symbol values itself, thereby determining the measurement of the SPS signal faster (e.g., sooner) than if the mobile device 58 determined the symbol values. Also or alternatively, by using the symbol indications the processor 60 may be able to determine the measurement of the SPS signal under conditions (e.g., poor SPS signal reception quality) that the processor 60 would not otherwise be able to determine the measurement of the SPS signals.

Determining the measurement of the SPS signal in stage 118 may be implemented in a variety of ways. For example, referring also to FIG. 6, a method 130 of determining a measurement of an SPS signal includes the stages shown. The method 130 is, however, an example only and not limiting. The method 130 may be altered, e.g., by having stages added, removed, rearranged, combined, performed concurrently, and/or having single stages split into multiple stages.

Figure 6:
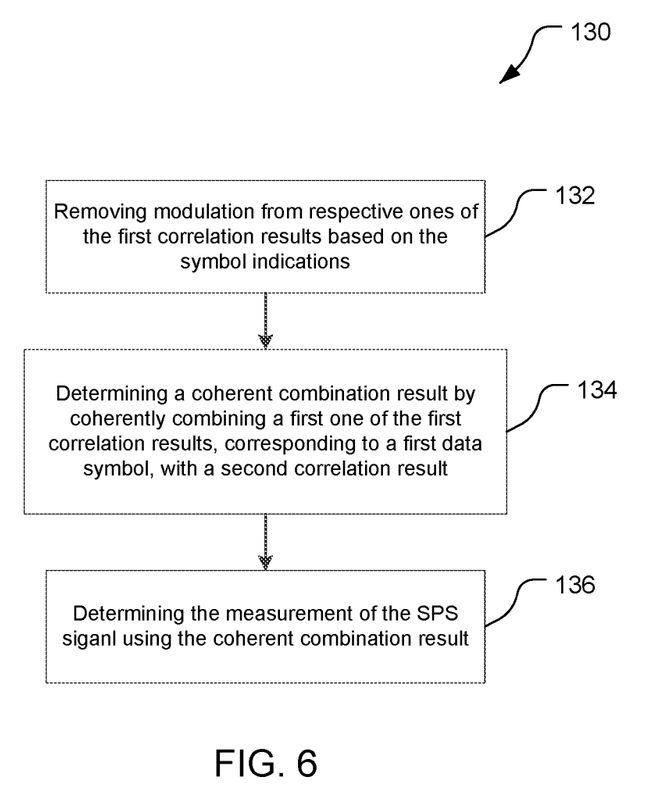
FIG. 6 is a block diagram of a method of determining a measurement of an SPS signal as shown in FIG. 5.

At stage 132, the method 130 includes removing modulation from respective ones of the first correlation results based on the symbol indications. The processor 60 may use the symbol indications to determine whether a symbol has been modulated and remove the modulation (e.g., invert the symbol) as appropriate (i.e., from modulated symbols).

At stage 134, the method 130 includes determining a coherent combination result by coherently combining a first one of the first correlation results, corresponding to a first data symbol, with a second correlation result. For example, the mobile device 58 (e.g., the processor 60) coherently integrates the first one of the correlation results and a second one of the first correlation results. The mobile device 58 may coherently integrate multiple symbols worth of the SPS data signal to increase the effective coherent integration length to improve SNR, which may provide improved results for determining the best timing match of a PN code, such as a Gold code, with received SPS data signal for use in determining time of travel of the SPS data signal and thus for use in determining pseudo-range to the satellite 16, and ultimately position of the mobile device 58. Also or alternatively, the mobile device (e.g., the processor 60) may combine one or more correlation results of the SPS data signal with one or more corresponding correlation results of an SPS pilot signal (a correlation result corresponding to the SPS pilot signal being the second correlation result) to form one or more combined correlation results and then coherently integrating the combined correlation result(s). Also or alternatively, the method 130 may include receiving (e.g., by the processor 60 via at least one of the antennas 68 and the receiver 70) signal quality indications corresponding to respective ones of the symbol indications. In this case, the method 130 may further include determining (e.g., by the processor 60), based on the signal quality indications, whether to use the symbol indications corresponding to the signal quality indications and associated ones of the first correlation results to determine respective coherent combination results.

At stage 136, the method 130 includes determining the measurement of the SPS signal using the coherent combination result. For example, the mobile device 58 (e.g., the processor 60) uses the coherent integration of multiple symbols of the SPS data signal and/or the coherent integration of the combination of the SPS data signal correlation and the SPS pilot signal correlation to determine the time of travel of the incoming SPS data signal. The processor 60 may use the time of travel in a known manner, e.g., in combination with other times of travel of other SPS data signals from other satellites 16, to determine pseudo-ranges to satellites 16 and thus the position of the mobile device 58.

Figure 7:
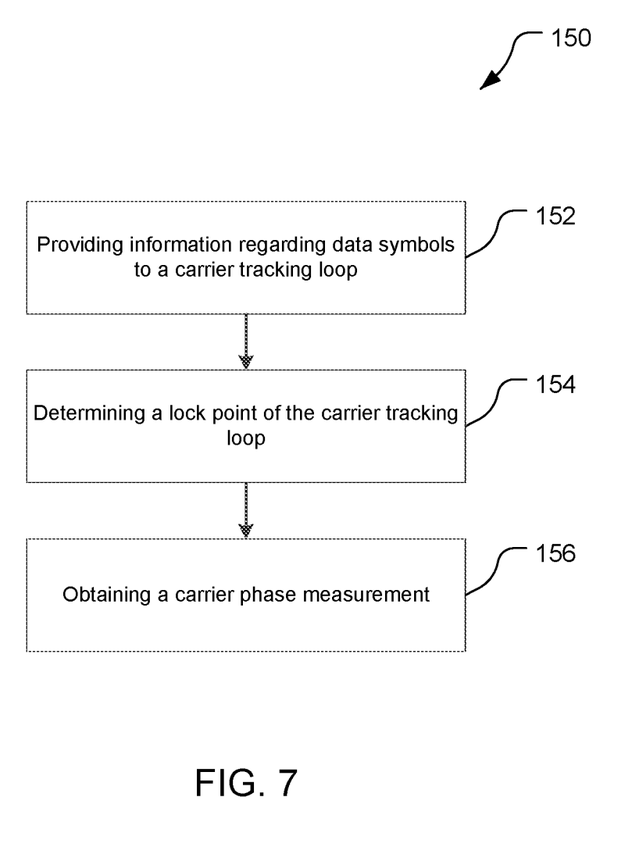
FIG. 7 is a block diagram of another method of determining a measurement of an SPS signal as shown in FIG. 5.

Referring again to FIG. 5, with further reference to FIGS. 1-4, determining the measurement of the SPS signal in stage 118 may be implemented in accordance with a method 150 shown in FIG. 7, which includes the stages shown. The method 150 is, however, an example only and not limiting. The method 150 may be altered, e.g., by having stages added, removed, rearranged, combined, performed concurrently, and/or having single stages split into multiple stages.

At stage 152, the method 150 includes providing information regarding data symbols to a carrier tracking loop. For example, the processor 60 may provide one or more symbol modulation levels (i.e., modulation level of each of one or more symbols) to the carrier tracking loop 72.

At stage 1542, the method 150 includes determining a lock point of the carrier tracking loop. For example, the CTL 72 locks to a phase of correlation results (e.g., the first correlation results. For example, the CTL 72 may be a Costas loop, that has a 180° ambiguity in its lock point. The CTL 72 may use the information regarding the data symbols as a phase reference to determine lock polarity and thus an offset, if any, in the phase of the correlation results to which the CTL 72 locks and to compensate for any such offset to determine the lock point.

At stage 156, the method 150 includes obtaining a carrier phase measurement. For example, the CTL 72 determines and provides to the processor 60, or the processor 60 determines, the carrier phase of the SPS signal based on the lock point of the CTL 72. The carrier phase may be determined based on further information such as an integer portion of phase and a fractional portion of phase, with the lock point resolving a 0.5 cycle ambiguity in the fractional portion.

Returning again to FIG. 5, with further reference to FIGS. 1-4, the method 110 may include one or more of the following features. For example, the method 110 may include receiving the SPS data signal at the terrestrial wireless communication system, determining symbols of the SPS data signal without performing forward error correction (FEC) decoding and/or deinterleaving, and sending the symbol indications to the mobile wireless communication device, the symbol indications corresponding to the symbols of the SPS data signal determined without performing FEC decoding and/or deinterleaving. Also or alternatively, the method 110 may include buffering, in the mobile wireless communication device (e.g., in the memory 62), information associated with the SPS signal, with the buffering performed before coherently integrating the first correlation results corresponding to the information. The buffering may be for at least an amount of time corresponding to the time between the processor 60 receiving an SPS data signal and having a symbol indication ready for use in removing the modulation of the SPS data signal. The information may comprise a time-domain sample of the SPS signal from an analog-to-digital converter, or a pre-processed time-domain sample of the SPS signal, or the correlation results, or any combination of these. Also or alternatively, the method 110 may include determining (e.g., by the processor 60) bit-edge timing of the SPS signal. For example, the processor may determine the bit-edge timing using pilot signals with overlay codes aligned to data bit timing, or performing satellite-vehicle differencing with satellites (other than the satellite from which the SPS signal was received) for which bit-edge timing is known, or using external aiding information, or a combination of any of these.

OTHER CONSIDERATIONS

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which at least some communications are conveyed wirelessly, e.g., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The term "processor-readable storage medium" as used herein refers to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected, coupled (e.g., communicatively coupled), or communicating with each other are operably coupled. That is, they may be directly or indirectly, wired and/or wirelessly, connected to enable signal transmission between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A wireless communication device comprising:
a memory;
a receiver configured to receive a satellite positioning system (SPS) signal, including an SPS data signal of unknown data content, from a satellite and to receive symbol indications, of determined symbol values corresponding to the SPS data signal, from a terrestrial wireless communication system; and
a processor communicatively coupled to the receiver and the memory and configured to:
perform correlation of the SPS data signal with a pseudo-random noise code to obtain first correlation results; and
use the symbol indications and the first correlation results to determine a measurement of the SPS signal;
buffer, in the memory, information associated with the SPS signal at least until a corresponding one of the symbol indications is received and ready for use in determining whether to remove modulation of a respective one of the first correlation results.

2. The wireless communication device of claim 1, wherein to determine the measurement of the SPS signal the processor is configured to:
remove modulation from respective ones of the first correlation results based on the symbol indications;
determine a coherent combination result by coherently combining a first one of the first correlation results, corresponding to a first data symbol, with a second correlation result; and
determine the measurement of the SPS signal using the coherent combination result.

3. The wireless communication device of claim 2, wherein to determine the coherent combination result, the processor is:
configured to coherently integrate the first one of the first correlation results and the second correlation result, wherein the second correlation result is a second one of the first correlation results; or
configured to coherently combine the first one of the first correlation results with a correlation result corresponding to an SPS pilot signal, wherein the correlation result corresponding to the SPS pilot signal is the second correlation result; or
a combination of these.

4. The wireless communication device of claim 2, wherein the processor is configured to receive signal quality indications corresponding to the symbol indications, and to determine, based on the signal quality indications, whether to use the symbol indications corresponding to the signal quality indications and associated ones of the first correlation results to determine respective coherent combination results.

5. The wireless communication device of claim 1, wherein the processor is configured to coherently integrate the first correlation results.

6. The wireless communication device of claim 1, wherein the processor is configured to buffer, as the information:
a time domain sample of the SPS signal from an analog-to-digital converter; or
a pre-processed time-domain sample of the SPS signal; or
the correlation results; or
a combination thereof.

7. The wireless communication device of claim 1, wherein to determine the measurement of the SPS signal the processor is configured to obtain a carrier phase measurement by providing information regarding data symbols to a carrier tracking loop to determine a lock point of the carrier tracking loop, wherein the carrier tracking loop is configured to lock to a phase of the first correlation results.

8. The wireless communication device of claim 1, wherein the satellite is a primary satellite, and wherein the processor is configured to determine bit-edge timing using pilot signals with overlay codes aligned to data bit timing, or by performing satellite-vehicle differencing with satellites, other than the primary satellite, for which bit-edge timing is known, or using external aiding information, or a combination of these.

9. The wireless communication device of claim 1, wherein the processor is configured to perform correlation of the SPS data signal, and determine the measurement of the SPS signal, without performing forward error correction decoding.

10. A method of processing a satellite signal, the method comprising:
receiving a satellite positioning system (SPS) signal, including an SPS data signal of unknown data content, from a satellite at a wireless communication device;
receiving symbol indications, of determined symbol values, from a terrestrial wireless communication system at the wireless communication device;
correlating the SPS data signal with a pseudo-random noise code to obtain first correlation results;
buffering, in the wireless communication device, information associated with the SPS signal at least until a corresponding one of the symbol indications is received and ready for use in determining whether to remove modulation of a respective one of the first correlation results; and
using the symbol indications and the first correlation results to determine a measurement of the SPS signal.

11. The method of claim 10, further comprising:
removing modulation from respective ones of the first correlation results based on the symbol indications;
determining a coherent combination result by coherently combining a first one of the first correlation results, corresponding to a first data symbol, with a second correlation result; and
determining the measurement of the SPS signal using the coherent combination result.

12. The method of claim 11, wherein determining the coherent combination result comprises:
coherently integrating the first one of the first correlation results and the second correlation result, wherein the second correlation result is a second one of the first correlation results; or
coherently combining the first one of the first correlation results with a correlation result corresponding to an SPS pilot signal, wherein the correlation result corresponding to the SPS pilot signal is the second correlation result; or
a combination of these.

13. The method of claim 11, further comprising:
receiving signal quality indications corresponding to respective ones of the symbol indications; and
determining, based on the signal quality indications, whether to use the symbol indications corresponding to the signal quality indications and associated ones of the first correlation results to determine respective coherent combination results.

14. The method of claim 10, further comprising determining bit-edge timing of the SPS signal.

15. The method of claim 14, wherein the satellite is a primary satellite, and wherein determining the bit-edge timing comprises:
using pilot signals with overlay codes aligned to data bit timing; or
performing satellite-vehicle differencing with satellites, other than the primary satellite, for which bit-edge timing is known; or
using external aiding information; or
a combination of these.

16. The method of claim 10, wherein determining the measurement of the SPS signal comprises obtaining a carrier phase measurement by providing information regarding data symbols to a carrier tracking loop to determine a lock point of the carrier tracking loop.

17. The method of claim 10, further comprising:
receiving the SPS data signal at the terrestrial wireless communication system;
determining symbols of the SPS data signal without performing at least one of forward error correction (FEC) decoding or deinterleaving; and
sending the symbol indications to the wireless communication device, the symbol indications corresponding to the symbols of the SPS data signal determined without performing at least one of FEC decoding or deinterleaving.

18. A wireless communication device comprising:
means for receiving a satellite positioning system (SPS) signal, including an SPS data signal of unknown data content, from a satellite;
means for receiving symbol indications, of determined symbol values, from a terrestrial wireless communication system;
means for correlating the SPS data signal with a pseudo-random code to obtain first correlation results;
means for buffering information associated with the SPS signal at least until a corresponding one of the symbol indications is received and ready for use in determining whether to remove modulation of a respective one of the first correlation results; and
means for using the symbol indications and the first correlation results to determine a measurement of the SPS signal.

19. The wireless communication device of claim 18, wherein the means for using include:
means for removing modulation from respective ones of the first correlation results based on the symbol indications;
means for determining a coherent combination result by coherently combining a first one of the first correlation results corresponding to a first data symbol with a second correlation result: and
means for determining the measurement of the SPS signal using the coherent combination result.

20. The wireless communication device of claim 19, wherein the means for determining the coherent combination result comprise:
means for receiving signal quality indications corresponding to respective ones of the symbol indications; and
means for determining, based on the signal quality indications, whether to use the symbol indications corresponding to the signal quality indications and associated ones of the first correlation results to determine respective coherent combination results.

21. The wireless communication device of claim 18, further comprising means for coherently integrating the first correlation results and means for buffering information associated with the SPS signal, the means for buffering being for buffering the information at least until a corresponding symbol indication is received and ready for use in determining whether to remove modulation of a respective one of the first correlation results.

22. The wireless communication device of claim 18, wherein the means for using include locking means for locking to a phase of the first correlation results and for determining a lock point using the symbol indications.

23. The wireless communication device of claim 18, further comprising means for determining bit-edge timing of the SPS signal.

24. The wireless communication device of claim 18, wherein the means for correlating and the means for using the symbol indications are for obtaining the first correlation results, and determining the measurement of the SPS signal, without performing forward error correction decoding.

25. A non-transitory, processor-readable storage medium storing processor-readable instructions configured to cause a processor to:
receive a satellite positioning system (SPS) signal, including an SPS data signal of unknown data content;
receive symbol indications of determined symbol values;
correlate the SPS data signal with a pseudo-random code to obtain first correlation results;
buffer information associated with the SPS signal at least until a corresponding one of the symbol indications is received and ready for use in determining whether to remove modulation of a respective one of the first correlation results; and
use the symbol indications and the first correlation results to determine a measurement of the SPS signal.

26. The storage medium of claim 25, further comprising instructions configured to cause the processor to:
remove modulation from respective ones of the first correlation results based on the symbol indications;
determine a coherent combination result by coherently combining a first one of the first correlation results, corresponding to a first data symbol, with a second correlation result; and
determine a position of a wireless communication device using the coherent combination result.

27. The storage medium of claim 26, further comprising instructions configured to cause the processor to determine, based on signal quality indications, whether to use the symbol indications corresponding to the signal quality indications and associated ones of the first correlation results to determine respective coherent combination results.

28. The storage medium of claim 25, further comprising instructions configured to cause the processor to coherently integrate the first correlation results corresponding to the information.

29. The storage medium of claim 28, wherein the information comprises:
a time domain sample of the SPS signal from an analog-to-digital converter; or
a pre-processed time-domain sample of the SPS signal; or
the correlation results; or
a combination thereof.

30. The storage medium of claim 25, wherein the instructions configured to cause the processor to determine the measurement of the SPS signal include instructions configured to cause the processor to obtain a carrier phase measurement by providing information regarding data symbols to a carrier tracking loop to determine a lock point of the carrier tracking loop.

31. The storage medium of claim 25, wherein the SPS signal is associated with a primary satellite, and wherein the storage medium further comprises instructions configured to cause the processor to determine bit-edge timing by:
using pilot signals with overlay codes aligned to data bit timing; or
performing satellite-vehicle differencing with satellites, other than the primary satellite, for which bit-edge timing is known; or
using external aiding information; or
a combination of these.

* * * * *